(12) United States Patent  (10) Patent No.: US 8,775,138 B2
Carpency et al.  (45) Date of Patent: Jul. 8, 2014

(54) METHODS FOR HANDLING WITHDRAWAL OF STREAMS FROM A LINEAR PROGRAMMING MODEL DEVELOPED FROM A THERMODYNAMICALLY-BASED REFERENCE TOOL

(75) Inventors: Joseph F. Carpency, Seabrook, TX (US); Tom H. Arendt, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 624 days.

(21) Appl. No.: 12/579,514

(22) Filed: Oct. 15, 2009

(65) Prior Publication Data

US 2010/0131250 A1 May 27, 2010

Related U.S. Application Data

(60) Provisional application No. 61/116,951, filed on Nov. 21, 2008.

(51) Int. Cl.
*G06G 7/50* (2006.01)
*G06F 17/10* (2006.01)
*G05B 13/02* (2006.01)
*C07C 7/10* (2006.01)
*G06F 17/11* (2006.01)
*G06F 17/17* (2006.01)
*G05B 13/00* (2006.01)

(52) U.S. Cl.
CPC .......... *G06F 17/11* (2013.01); *G06F 17/17* (2013.01); *G05B 13/00* (2013.01); *Y10S 208/01* (2013.01)

USPC ............ 703/9; 703/2; 703/6; 700/31; 700/28; 700/29; 700/30; 700/38; 585/1; 208/DIG. 1

(58) Field of Classification Search
CPC ....... G06F 17/11; G06F 17/17; G05B 13/042; G05B 13/00; Y10S 208/01
USPC ............................. 700/299, 300; 703/2, 7, 9
See application file for complete search history.

(56) References Cited

U.S. PATENT DOCUMENTS

| 3,828,171 | A | * | 8/1974 | Griffin | 700/273 |
|---|---|---|---|---|---|
| 3,891,836 | A | * | 6/1975 | Lee | 700/3 |
| 4,349,869 | A | * | 9/1982 | Prett et al. | 700/39 |
| 5,486,995 | A | * | 1/1996 | Krist et al. | 700/29 |
| 5,504,692 | A | * | 4/1996 | Cardner | 700/266 |
| 5,666,297 | A |   | 9/1997 | Britt et al. | |
| 6,028,992 | A | * | 2/2000 | Henriot et al. | 703/9 |
| 6,038,540 | A | * | 3/2000 | Krist et al. | 700/36 |
| 6,128,579 | A | * | 10/2000 | McCormack et al. | 702/13 |
| 6,258,987 | B1 | * | 7/2001 | Schmidt et al. | 585/3 |
| 6,442,513 | B1 |   | 8/2002 | Cheng et al. | |

(Continued)

OTHER PUBLICATIONS

Informs paper "Successive Linear Programming at Exxon" by Thomas E. Baker et al. (Mar. 1985, pp. 264-274).*

(Continued)

*Primary Examiner* — Akash Saxena

(57) ABSTRACT

The invention relates to linear programming methods and systems. The linear programming model has at least one input streams, at least one intermediate stream, and at least one output stream. The linear programming model is utilized for simulating the effect of withdrawing at least a portion of an intermediate steam on one or more of the model's outputs.

8 Claims, 4 Drawing Sheets

(56) References Cited

U.S. PATENT DOCUMENTS

| | | | |
|---|---|---|---|
| 6,651,035 B1* | 11/2003 | Lang | 702/183 |
| 6,721,610 B2 | 4/2004 | Gade et al. | |
| 6,922,593 B2* | 7/2005 | Weiss | 700/30 |
| 6,983,190 B2* | 1/2006 | Denton et al. | 703/2 |
| 7,257,451 B2* | 8/2007 | Carpency et al. | 700/30 |
| 7,263,473 B2* | 8/2007 | Cutler | 703/2 |
| 7,463,937 B2* | 12/2008 | Korchinski | 700/31 |
| 7,474,998 B2* | 1/2009 | Meents et al. | 703/2 |
| 7,729,809 B2* | 6/2010 | Noureldin | 703/2 |
| 7,778,803 B1* | 8/2010 | Bax | 703/2 |
| 7,801,710 B2* | 9/2010 | Sturrock et al. | 703/2 |
| 7,873,443 B2* | 1/2011 | Noureldin et al. | 700/299 |
| 7,946,127 B2* | 5/2011 | Fountain | 700/282 |
| 8,036,759 B2* | 10/2011 | Sheth et al. | 700/29 |
| 8,116,918 B2* | 2/2012 | Noureldin et al. | 700/299 |
| 2002/0016640 A1* | 2/2002 | Gagne | 700/29 |
| 2003/0097243 A1* | 5/2003 | Mays et al. | 703/2 |
| 2005/0090921 A1* | 4/2005 | Denton et al. | 700/100 |
| 2005/0107895 A1* | 5/2005 | Pistikopoulos et al. | 700/52 |
| 2005/0171625 A1* | 8/2005 | Denton et al. | 700/102 |
| 2005/0171826 A1* | 8/2005 | Denton et al. | 705/8 |
| 2006/0089518 A1* | 4/2006 | Bouvart et al. | 585/1 |
| 2006/0184254 A1* | 8/2006 | Carpency et al. | 700/30 |
| 2008/0015839 A1* | 1/2008 | Noureldin et al. | 703/18 |
| 2008/0269955 A1* | 10/2008 | Yasui et al. | 700/299 |
| 2008/0307826 A1* | 12/2008 | Coward | 700/30 |
| 2009/0119237 A1* | 5/2009 | Triantafillidis | 703/2 |
| 2009/0145810 A1* | 6/2009 | Etter | 208/52 R |
| 2009/0209799 A1* | 8/2009 | Etter et al. | 585/653 |
| 2010/0280803 A1* | 11/2010 | Famili et al. | 703/2 |
| 2011/0046997 A1* | 2/2011 | Noureldin et al. | 705/7.12 |
| 2011/0054715 A1* | 3/2011 | Noureldin et al. | 700/300 |
| 2012/0016828 A1* | 1/2012 | Triantafillidis | 706/14 |
| 2012/0109604 A1* | 5/2012 | Chen et al. | 703/2 |

OTHER PUBLICATIONS

Global Optimization of Bilinear Process Networks With Multi Component Flows I Quesada et al, Elsevier Science Ltd. 1995, pp. 1219-1242.*

* cited by examiner

METHODS FOR HANDLING WITHDRAWAL OF STREAMS FROM A LINEAR PROGRAMMING MODEL DEVELOPED FROM A THERMODYNAMICALLY-BASED REFERENCE TOOL

CROSS-REFERENCE TO RELATED APPLICATIONS

This application is a conversion of a provisional application to a non-provisional application and claims the benefit of and priority to U.S. Application No. 61/116,951, filed Nov. 21, 2008, the disclosure of which is herein incorporated by reference in its entirety.

BACKGROUND OF THE INVENTION

1. Field of the Invention

Embodiments of the present invention generally relate to linear programming (LP) models developed from a non-linear reference tool. More particularly, the invention relates to linear programming (LP) models of a manufacturing facility developed from a thermodynamically-based reference tool.

2. Description of the Related Art

Steady-state, fundamental-principles models have been used to represent a manufacturing facility, which typically consists of a plurality of separate process units or sections of process units that function together to achieve an overall objective of the facility. Difficulties arise in effectively optimizing the operation of a manufacturing facility due to various factors. Such factors can include a vast variety of separate process units and equipment that are contained in the facility. Other factors typically include the large number of process variables, the large number of potential feedstocks and feedstock compositions, operating variables (e.g., flow rates, temperatures, pressures, etc.), product specifications, market constraints and prices (e.g., for feeds, products, and utilities), mechanical constraints, transportation and storage constraints, and weather conditions.

Consequently, manufacturers typically use commercially available, computer based models that have been developed to accurately simulate and/or optimize the operation of their facilities. These commercially available tools are usually one of two types: first principles reference tools or derived tools.

First principles reference tools are based on first principles (i.e., mathematical relationships or logic that utilize accepted scientific theories or laws, such as those regarding chemical thermodynamics and/or kinetics, which theories or laws have been validated through repeated experimental tests) and that typically possess the capability to separately model many or all of the individual process units in a manufacturing facility. First principles reference tools typically contain a library that provides thermodynamic information about how different molecules, components, or pseudo-components will perform in these process units. These tools can be used to create a model of a manufacturing facility, or section thereof, by using the thermodynamic library to individually model the various process units in the facility and then connect the process units appropriately to reflect the overall facility. Such a model can then directly provide heat and material balance information, which can be used for design, equipment rating, equipment performance, simulation, and optimization of the facility.

Unfortunately, first principles reference models tend to be computationally intensive. Accordingly, substantial computer time and resources can be required to run a model based thereon. Examples of commercially available first principles reference tools include HYSIS® and Aspen Plus®, which are products of Aspen Technologies Incorporated of Cambridge, Mass.; PRO/II®, which is a product of SimSci-Esscor, an operating unit of Invensys plc of Cheshire, United Kingdom; and SPYRO®, which is a product of Technip-Coflexip SA of Paris, France.

Recently, a new generation of first principles reference tools has been developed that are capable of modeling, solving, and optimizing an entire manufacturing facility. Examples of these new reference tools are AspenTech RT-OPT®, which is a product of Aspen Technology Incorporated of Cambridge, Mass., and SimSci ROMeo®, which is a product of SimSci-Esscor, an operating unit of Invensys plc, of Cheshire, United Kingdom. These tools are capable of solving very large simulation or optimization problems, usually via a non-linear simultaneous equation solver and/or optimizer. However, given the enormous size and complexity of a first principles reference model for an entire manufacturing facility, as well as its non-linear nature, solution of the model can require huge amounts of computing resources and can take substantial periods of time, especially in optimization mode.

Derived tools, on the other hand, require less computing power and time than a first principles model to solve a problem of similar size and complexity. Derived tools are tools that possess very convenient structures, albeit simplified, to depict many or all of the process unit operations needed to model a manufacturing facility. These derived tools have convenient report writing capabilities, and may possess various analysis tools to help explain the modeling results. In general, derived tools use either linear programming (LP) or sequential linear programming (SLP) type mathematics to solve optimization problems.

However, these tools do not have the capability to model process unit operations based on first principles, nor do they contain a thermodynamic library to describe how different molecules, components, or pseudo-components would perform in such process unit operations. As such, these derived tools cannot directly provide heat and material balance information for use in design, equipment rating, equipment performance, simulation, and optimization of the facility. Rather, a model in these derived tools requires that a depiction of the facility to be modeled be developed in some other engineering tool (e.g., HYSIS®, Aspen Plus®, PRO/II®, and SPYRO®, referred to above, as well as other commercially available engineering tools that would be well known to persons skilled in the art of modeling industrial process facilities). This depiction is then imported into the derived tool.

Nevertheless, given their convenient form and analysis capabilities, as well as the computing advantages of LP or SLP programming, derived tools have generally been preferred for use in operational planning, feedstock selection, and optimization of manufacturing facilities. Examples of commercially available derived tools are AspenTech PIMS®, which is a product of Aspen Technology Incorporated of Cambridge, Mass., and SimSci Petro®, which is a product of SimSci-Esscor, an operating unit of Invensys plc, of Cheshire, United Kingdom.

Due to computing limitations, models based on a combination of first principles reference tools and derived tools have been developed for large processing facilities. Such models typically treat a large processing facility as two or more facilities, where each facility is broken into two or more separate models of individual process units and interconnected to represent the overall facility. By doing so, intermediate stream connectivities have to be accounted for. An intermediate stream is a stream that flows from one process unit into one or more other process units. For example, a product stream from an upstream process unit may become an input stream to one or more downstream process units, or a recycle stream from a downstream process unit may become an input stream to one or more upstream process units. Thus, a change in the products from a particular upstream process unit may cause a change in a recycle stream from a downstream process unit, which in turn may cause another change in the same or a different upstream process unit. The overall derived computer model for the facility must accurately model these effects.

There are several inherent problems with representing a manufacturing facility by two or more separate models. For example, a complex process unit, such as a reactor or steam cracker, may have fifteen or more separate process units that must be accurately modeled to create the overall derived model. Such complex process units may also have a large number of recycle streams that must be accurately modeled. When the individual derived models for each process unit and recycle streams are joined together to form the overall derived model for the facility, inconsistencies between individual derived models (e.g., inconsistencies in the underlying engineering tools or in the heat and material balance basis) can result in a more difficult validation process and, in some situations, in non-convergence or unacceptable inaccuracies in the overall model.

U.S. Patent Application Publication No. 2003/0097243 A1 discloses a computerized system and method for operating a hydrocarbon or chemical production facility, comprising mathematically modeling the facility; optimizing the mathematic model with a combination of linear and non-linear solvers; and generating one or more product recipes based upon the optimized solution. In one embodiment, the mathematic model further comprises a plurality of process equations having process variables and corresponding coefficients. Preferably, these process variables and corresponding coefficients are used to create a matrix in a linear program. The linear program may be executed by recursion or distributed recursion. Upon successive recursion passes, updated values for a portion of the process variables and corresponding coefficients are calculated by the linear solver and by a non-linear solver, and the updated values for the process variables and corresponding coefficients are substituted into the matrix. Unfortunately, the simultaneous use of multiple solvers, some of which are non-linear, can result in significant computing time and resource disadvantages.

U.S. Pat. No. 5,666,297 discloses a software system for simulating and optimizing a processing plant design. The software system includes a plurality of dual mode equipment models for simulating each piece of equipment in the processing plant design. A sequential modular simulation routine is used to execute the equipment models in a first mode to define a first set of values of the operating parameters of the processing plant design. Then, a simultaneous simulation/optimization routine executes the equipment models in a second mode. The simultaneous simulation/optimization routine utilizes the first set of values for the plant's operating parameters from the sequential simulation routine and subsequently determines a second set of values of the operating parameters at which the processing plant design is optimized. The equipment models after execution by the sequential simulation routine and the simultaneous simulation/optimization routine store the first and second sets of values for the operating parameters in a common plant model file.

U.S. Pat. No. 6,442,513 discloses a method for real-time optimization of an oil refinery, or a portion thereof, where a fluid stream having multiple physical components is modeled as a plurality of pseudo-components. Each physical component has a boiling point, and each pseudo-component has a pre-defined boiling point and includes all physical components from the fluid stream having approximately the pre-defined boiling point. According to this patent, good modeling results may be obtained by grouping compounds and molecules into pseudo-components or lumps based on boiling points, and by modeling based on such lumps. This is especially true in view of the fact that much of the operation of a refinery depends on boiling points of compositional components of crude oil.

U.S. Pat. No. 6,721,610 discloses a method for pre-calculating the parameters of industrial processes and/or products. According to this method, a vector of admissible input variables of the industrial process and/or product is defined. Definition ranges are assigned to each variable in the input vector. A process output vector is determined with the pre-calculable process parameters. Known information on the process is stored in a data bank and ranges of validity for the process input variables are allocated to this information. For each process input vector inputted from an admissible definition range provided with valid information, exactly one process output vector is determined according to the information.

U.S. Pat. No. 7,257,451 discloses a method for creating a LP model of an industrial process facility from a first principles reference tool to interactively simulate and/or optimize the operation of the facility to facilitate or optimize feedstock selection and/or other economic analyses based on varying prices, availabilities, and other external constraints.

However, none of these models describe how to simulate the impact of partially withdrawing intermediate streams from within the process facility to simulate the impact on products and facilities. There is a need, therefore, for an improved method for interactively simulating and/or optimizing the operation of a facility to facilitate or optimize feedstock selection and/or other economic analyses based on varying prices, availabilities, and other external constraints.

SUMMARY OF THE INVENTION

Methods and systems for withdrawing a stream from a linear programming model of a manufacturing facility are provided. In at least one specific embodiment, the method includes specifying one or more independent input variables and one or more key output variables within the linear programming model. A stream within the model to be at least partially withdrawn is identified, and a stream is added to the model. The added stream has one or more component rates that are perturbed. The one or more key output variables are solved in response to the perturbation of the component rates to create a derivative for the perturbed component rates. The derivatives are negated, and an amount of withdrawal for the identified stream is specified. The resulting component rates of the stream to be at least partially withdrawn can be determined based on the specified amount of withdrawal, and these component rates and the negated derivatives are then used to simulate or determine the effect of removing this stream on the one or more key output variables.

In at least one specific embodiment, the system includes a means for specifying one or more independent input variables and one or more key output variables within the linear programming model; a means for identifying a stream within the model to be at least partially withdrawn; a means for adding a stream to the model, wherein the added stream has one or more component rates; a means for perturbing at least one of the component rates; a means for solving the one or more key output variables in response to the perturbation of the component rates to create a derivative for each perturbed component rate; a means for negating each derivative; a means for specifying an amount of withdrawal for the identified stream; a means for determining resulting component rates of the stream to be at least partially withdrawn based on the specified amount of withdrawal; and means for determining effects on the one or more key output variables based on the component rates of the stream to be withdrawn and the negated derivatives. As discussed in more detail below, any of the foregoing means can be the same or different.

BRIEF DESCRIPTION OF THE DRAWINGS

So that the recited features of the present invention can be understood in detail, a more particular description of the invention, briefly summarized above, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

DETAILED DESCRIPTION

A detailed description will now be provided. Each of the appended claims defines a separate invention, which for infringement purposes is recognized as including equivalents to the various elements or limitations specified in the claim. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

In at least one embodiment, the linear programming (LP) model is derived from a non-linear, first principles reference model of a manufacturing facility. The resulting LP model can be used to facilitate simulation and/or optimization of the facility. As used herein and in the appended claims, the terms "linear programming," "LP," and "LP model" shall be deemed to also include, respectively, "sequential linear programming," "SLP," and "SLP model."

As used herein, the terms "manufacturing facility" or simply "facility" shall mean any facility that is adapted to refine, purify, convert, consume, or otherwise process any material to produce desired products, and includes, but is not limited to, petroleum refineries, catalytic and steam crackers, petrochemical plants, other chemical plants (i.e., chemical plants that are not based on petrochemicals), facilities for converting natural gas and/or methanol into other hydrocarbons, natural gas liquefaction plants, polymer and plastics plants, steel mills, pharmaceutical manufacturing plants, and electric power generating plants. In some cases, a manufacturing facility may include two or more separate facilities, such as a petroleum refinery together with one or more petrochemical facilities.

In one or more embodiments, the facility can include two or more separate process units or sections of process units that function together to achieve the overall objective of the facility. In one or more embodiments, the facility can include a grouping or combination of process units, such as a steam cracker and a refinery, to be optimized together. As used herein, a "process unit" is an apparatus or device that performs a specific function, such as a process gas compressor unit, a fractionator, a reformer, a hydrotreater, a distillation column, a quench tower, a de-ethanizer, a cogeneration unit, or a refrigeration unit, and a "section" of process units is a grouping of two or more associated process units.

Figure 1A:
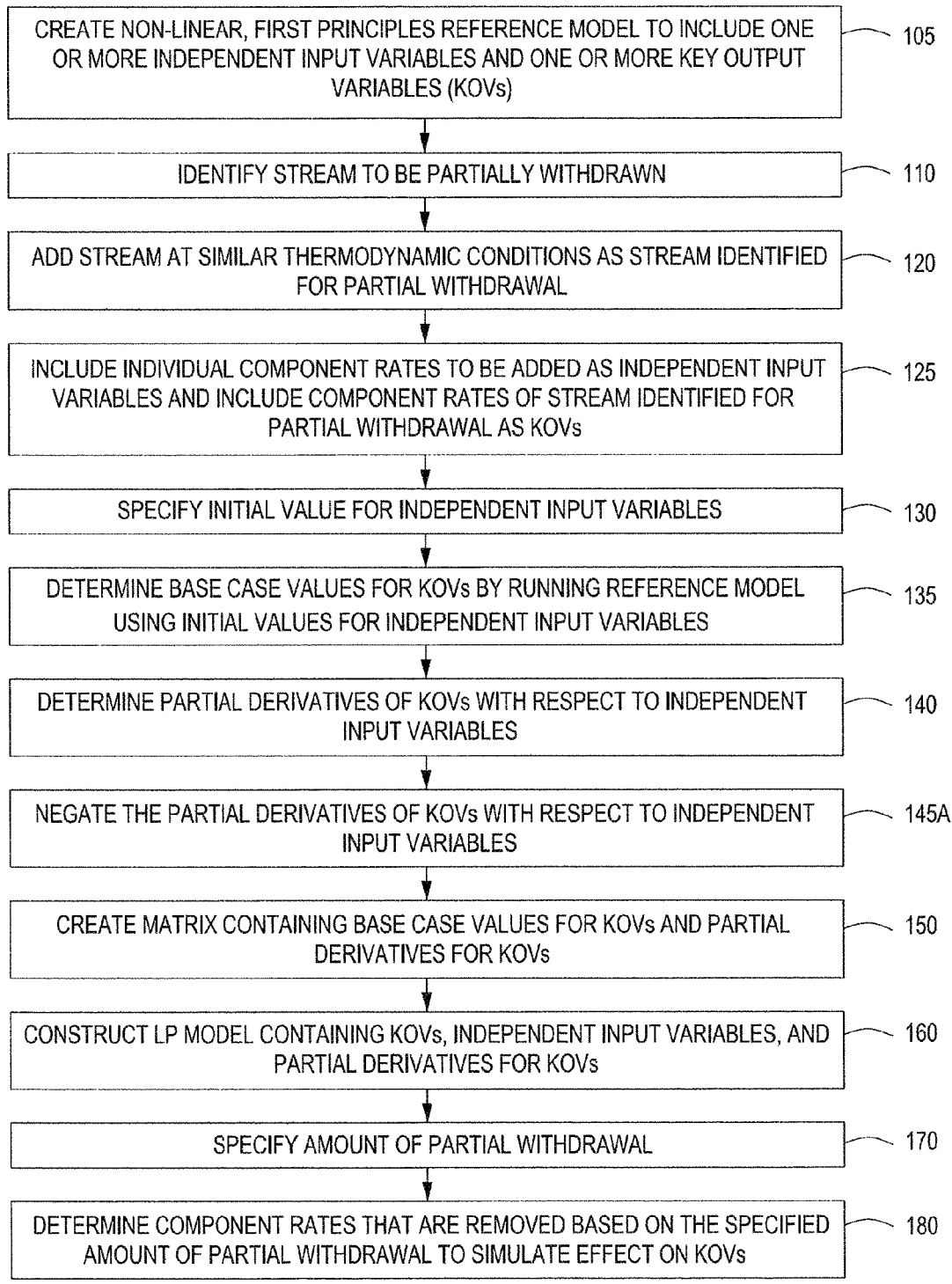
FIG. 1A is a flow diagram for interactively simulating and/or optimizing the operation of a facility to facilitate or optimize feedstock selection and/or other economic analyses based on varying prices, availabilities, and other external constraints, according to one or more embodiments described.

FIG. 1A is a flow diagram for interactively simulating and/or optimizing the operation of a facility to facilitate or optimize feedstock selection and/or other economic analyses based on varying prices, availabilities, and other external constraints, according to one or more embodiments. At step 105, a non-linear, first principles reference model is created. The model includes one or more independent input variables and one or more key output variables (KOVs). The independent input variables are those input variables that can be independently controlled and that may have a significant impact on the overall performance of any process unit within the facility. Such independent input variables can include, but are not limited to, feedstock flow rates and feedstock compositions (or, alternatively, flow rates for the feedstock component(s)), flow rates for the component(s) in all external feed streams, product flow rates, and critical operating parameters such as temperature, pressure, power, heat, boiling point, vapor fraction, and/or liquid fraction.

The KOVs are those output variables the user desires to monitor in the model, such as those output variables that directly impact the economic performance of the facility. Illustrative KOVs include, but are not limited to, quality of selected products, amount of energy consumed (i.e. heat, power, work), values for potential system constraints, and flow rates of the product(s). Such flows rates of the product(s) can be component flow rates or overall stream rates.

Once the input variables and KOVs are set, the first principles reference model can be run (in simulation mode) using initial values for the independent input variables to determine base case values for the KOVs. Assuming that the first principles reference model is an accurate depiction of the process units and/or facility, the base case values for the KOVs should accurately predict the actual performance of the unit(s) and/or facility at the specified input conditions.

At step 110, one or more streams for at least partial withdrawal can be selected, tagged or otherwise identified to determine effects on downstream processes, feeds, and/or products. The one or more streams for at least partial withdrawal can be completely removed. In one or more embodiments, the component rate(s) of the identified stream(s) for at least partial withdrawal can be tagged as KOV(s). As such, the LP model, which is described in more detail below, can calculate the component rate(s) of that stream(s) as a function of the independent input variables, just as it would track any other KOV(s). The component rates can be based on mass, moles, or volume, depending on the user's convenience and/or convention. Preferably, mass or moles are used.

At step 120, a stream is added to the model. The added stream ("new stream") is preferably given similar or identical thermodynamic conditions, typically temperature and pressure, as the stream identified in step 110. It is preferable that the added stream also have at least the same number of major components as the stream to be at least partially withdrawn. Preferably, the new stream is added to the model at a point downstream of the stream to be at least partially withdrawn. More preferably, the new stream is added to the model at a point immediately downstream of the stream to be at least partially withdrawn, i.e. prior to any other unit operation in the model. At step 125, the independent input variables of step 105 are modified to include the individual component rates that were added in step 120, and the KOVs of step 105 are modified to include the component rates of the stream identified for at least partial withdrawal in step 110. At step 130, an initial value for the independent input variables is specified. At step 135, the first principles reference model is run (in simulation mode) using the initial values for the independent input variables specified in step 130 to determine base case values for the KOVs.

At step 140, partial derivatives of the KOVs with respect to the independent input variables can be determined. The partial derivatives can be determined by (1) selecting a first one of the independent input variables, (2) perturbing the value of the selected independent input variable, (3) running the first principles reference model using the perturbed value for the selected independent input variable and the initial values for all other independent input variables, (4) determining the resulting change in each of the key output variables from its base case value, (5) dividing the resulting change in each key output variable by the amount of the perturbation in the selected independent input variable to determine the partial derivatives of each key output variable with respect to the selected independent input variable, (6) resetting the selected independent input variable to its initial value, and (7) repeating steps (1) through (6) for each of the other independent input variables.

Any reasonably sized perturbation can be used in step (2); however, where practical, the size of the perturbation in a well-scaled model is preferably set at unity, e.g., one thousand pounds per hour (1.0 klb/hr) for an input feed stream, where feed stream flow rates are measured in thousands of pounds per hour. By setting the size of the perturbation at unity, the need to divide the resulting change in the KOVs by the amount of the perturbation to determine the partial derivatives, i.e. step (5) is eliminated.

However, even in a well-scaled model where a large portion of the independent input variables can be perturbed by unity, exceptions will exist. For example, a steam to hydrocarbon ratio for a steam cracker furnace is typically in the range of 0.25 to 0.6. Accordingly, 0.1 is a more reasonable perturbation (a perturbation of 1.0 would be too high). Conversely, for a pressure initially set at 2,500 KPa, a perturbation of 1 KPa would be too low and might produce "noisy" derivatives. In that case, a 10 KPa perturbation would be preferable.

In one or more embodiments, the partial derivatives of the KOVs with respect to the independent input variables can be determined using a "sensitivity analysis." A sensitivity analysis is a feature readily available in commercial non-linear optimization systems, such as the optimization systems used in AspenTech's RT-Opt® or SimSci's ROMeo®. Details of an applicable sensitivity analysis can be found in U.S. Pat. No. 7,257,451.

At step 145A, the partial derivatives calculated in step 140 can be negated to simulate removal of the components identified in step 120. Recall in step 120, a new stream with its components is added to the model. Negating the partial derivatives of the added components turns the effective addition of those components into the effective removal of each of those components.

At step 150, a matrix can be constructed containing the base case values for the KOVs and the partial derivatives for the KOVs. The matrix is typically (n+1) columns wide by m rows high, where "n" is the number of independent input variables and "m" is the number of key output variables. One column of the matrix can contain the base case values for the KOVs, and the other n columns of the matrix can contain the partial derivatives for the KOVs with respect to the independent input variables. Optionally, partial derivatives smaller than a pre-selected minimum value can be omitted from the matrix (or alternatively its value can be combined with another component in the matrix while this value is dropped) so as to reduce the total number of partial derivatives in the matrix and, therefore, the time required to solve the final LP using the matrix.

Persons skilled in the art of computer modeling will recognize that the rows and columns of the matrix could be reversed, i.e., creating a matrix (n+1) rows high by m columns wide. Persons skilled in the art will also recognize that the use of a matrix is a convenient and conventional method to incorporate a set of partial derivatives into a LP model. Persons skilled in the art will also recognize that other methods for incorporating the partial derivatives into a LP model (e.g., individual look-up tables for each key output variable) are essentially equivalent to the matrix approach.

At step 160, the final LP model can be constructed using the matrix of base case values and partial derivatives. The resulting LP model may then be used to calculate the value of one or more of the KOVs from the matrix and a set of known and/or assumed values for the independent input variables. Preferably, this calculation is performed according to the following equation:

$$KOV_y = KOV_{y(base)} + \sum_{1}^{n} (I_x - I_{x(initial)})\left(\frac{\partial KOV_y}{\partial I_x}\right),$$

where $KOV_y$ represents the $y^{th}$ key output variable (y=1, ... m), $KOV_{y(base)}$ represents the base case value for the $y^{th}$ key output variable, $I_x$ represents the known or assumed value for the $x^{th}$ independent input variable (x=1, ... , n), $I_{x(initial)}$ represents the initial value for the $x^{th}$ independent input variable, and $$\frac{\partial KOV_y}{\partial I_x}$$

represents the partial derivative of the $y^{th}$ key output variable with respect to the $x^{th}$ independent input variable.

At step 170, the amount of partial withdrawal can be specified. The amount can be expressed as a rate, fraction, or percentage. This amount of partial withdrawal is a new independent variable introduced into the model and represents the rate (or percentage or fraction) of the stream to be at least partially withdrawn. The amount of partial withdrawal can be fixed (a single value) or an optimizable variable (over a range) as far as the LP is concerned.

At step 180, the component rates that are removed can be determined based on the specified amount of partial withdrawal (step 170). The rate (or percentage or fraction) of step 170 multiplied by the variable composition (or component mass rates) for the stream to be partially withdrawn provides the component flowrates that are desired to be removed. The sum of these component flowrates times the partial derivative with respect to each of these component flowrates calculated in step 145A provides the correct or actual response in the LP model for withdrawing a stream of that rate and variable composition from that point in the process.

Figure 1B:
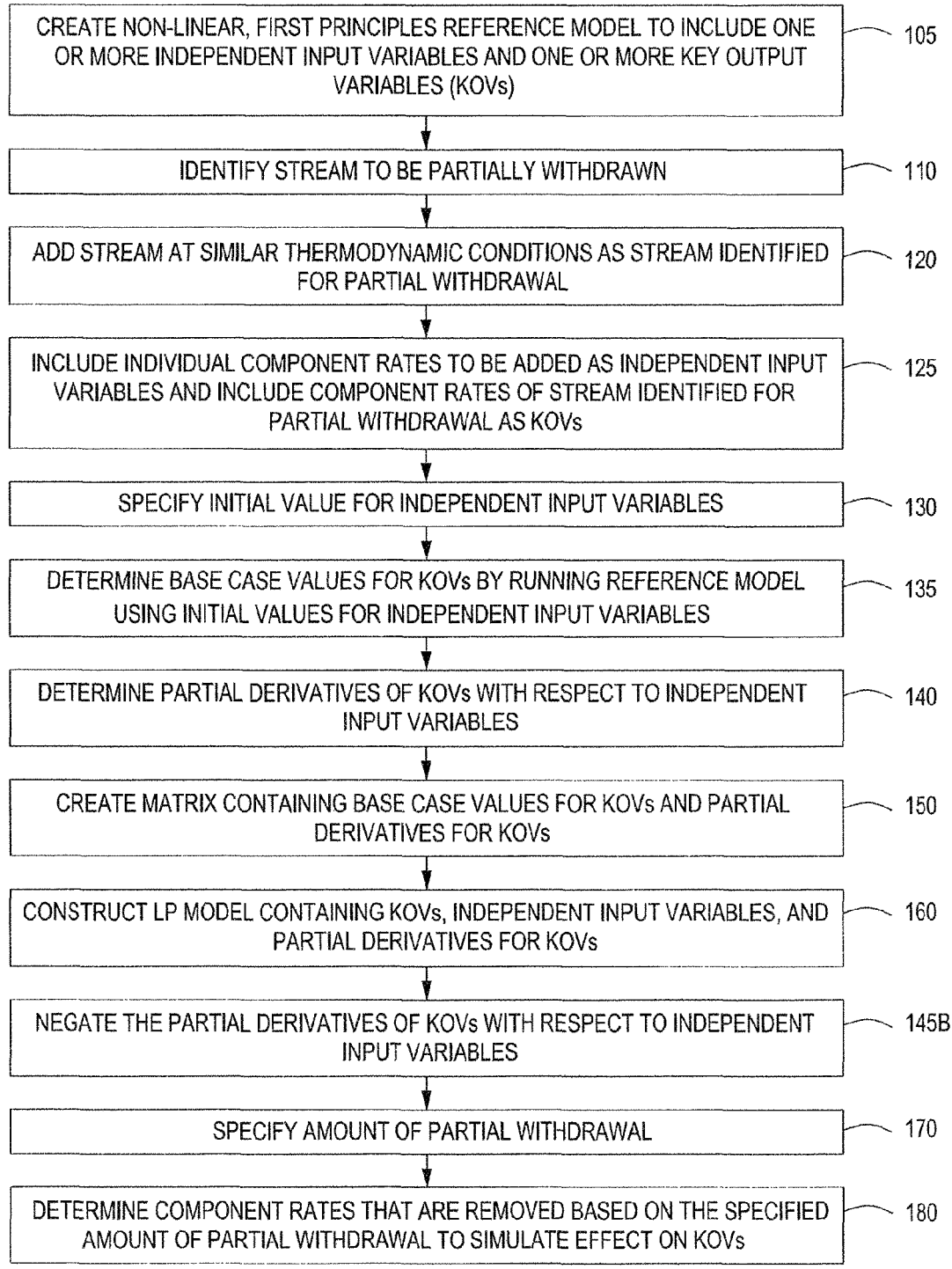
FIG. 1B is an alternative flow diagram for interactively simulating and/or optimizing the operation of a facility to facilitate or optimize feedstock selection and/or other economic analyses based on varying prices, availabilities, and other external constraints, according to one or more embodiments described.

FIG. 1B shows an alternative embodiment where the step of negating the partial derivatives of the KOVs with respect to the independent input variables (step 145A in FIG. 1A) can be performed at step 145B after the matrix of step 150 and the LP model of step 160 are constructed. In either step 145A or step 145B, negating the partial derivative can be accomplished by multiplying the partial derivative by a negative 1 or by dividing the partial derivative by negative 1. There are also many other ways or techniques to negate the partial derivative that are readily apparent to those skilled in the art.

Embodiments described overcome maintenance problems that occur when the process units, prices, or availabilities change in such a way as to invalidate or make inaccurate the derived model of the facility. For example, the performance of a process unit changes over time due to, for instance, fouling, or operating configurations are altered (e.g., by invoking a multiple processing option), or capacity utilization is significantly altered. With the present invention, such changes (fouling, configuration, or new operating regime) are simply reflected in the first principles reference model, and the set of partial derivatives that depict the process unit in the LP model are re-derived and updated. This can be accomplished in a relatively short period of time.

The LP model can also be used for operating and/or optimizing the facility. For example, the LP model can be used in optimization mode to determine the most profitable operating conditions by adding feed prices and availabilities, product prices and demands, utility prices, and other external constraints. The LP model can also be run in simulation mode to determine the potential effect of a planned or proposed change in operating conditions. The results of the simulation are then used to adjust at least one input condition (e.g., by changing feedstocks) or operating parameter (e.g., operating pressure and/or temperature) of the facility in order to achieve the desired effect.

The foregoing discussion can be further described with reference to the following prophetic example. The purpose of this prophetic example is to illustrate how to create a linear program model of a stream to be removed, regardless of composition, from an industrial process model.

Figure 2:
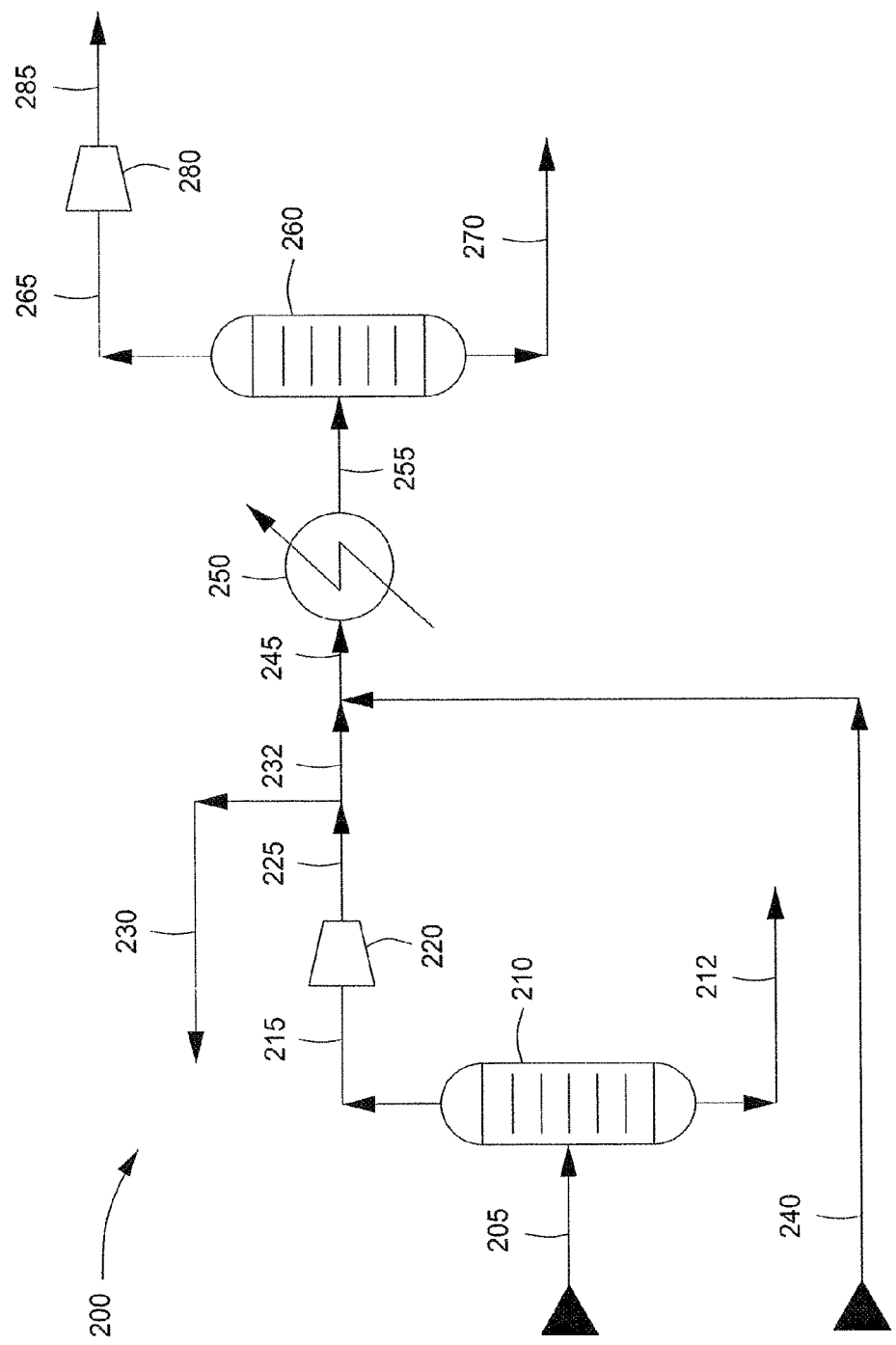
FIG. 2 is an illustrative process flow diagram of a manufacturing facility having a stream to be at least partially withdrawn, according to one or more embodiments described.

FIG. 2 is an illustrative process flow diagram of a manufacturing facility having a stream to be at least partially withdrawn, according to one or more embodiments. The facility 200 includes flash drums 210, 260, compressors 220, 280, and heat exchanger 250. A first hydrocarbon feed 205 can be introduced to the first flash drum 210 at conditions sufficient to separate the feed stream 205 into a vapor overhead via line 215 and a liquid bottoms via line 212. The liquid via line 212 is a product ("product 1").

The overhead 215 can be compressed using the compressor 220 to provide a compressed vapor in line 225. The compressed vapor in line 225 can be split into stream 230 and stream 232. The vapor within streams 230 and 232 has the same components and thermodynamic conditions as the vapor in line 225.

A second hydrocarbon feed via line 240 can be added or otherwise mixed with the compressed vapor in line 232 to form a mixture in line 245. The mixture in line 245 can be heated using heat exchanger 250, and then introduced to the second flash drum 260 via line 255. The vapor from the second flash drum 260 is removed overhead via line 265, and compressed using compressor 280. The compressed vapor via line 285 is a product ("product 2"). The liquid from the second flash drum 260 is also removed as a product via line 270 ("product 3").

Stream or line 225 is selected or identified as the stream for at least partial withdrawal, as described in step 110. Likewise, stream or line 240 is the new stream that is added at the same thermodynamic conditions as described in step 120. To simulate the affect of at least partially removing stream 225 from the process, an LP model is created by perturbing each component of stream 225 (step 140) and monitoring the effect on downstream equipment and products, such as the heat exchanger 250, second flash drum 260, overhead compressor 280, and product steams 270, 285. Table 1 summarizes the base operating conditions prior to perturbation.

TABLE 1

Base Case Operating Conditions.

| Process Unit | Variable | Value | Units |
|---|---|---|---|
| 205 | Methane | 20 | % |
|  | Ethane | 20 | % |
|  | Propane | 20 | % |
|  | Butane | 20 | % |
|  | Pentane | 20 | % |
|  | Flow rate | 100 | klb/hr |
| 210 | Temperature | 80 | ° F. |
|  | Pressure | 215 | psia |
| 220 | Pressure | 340 | psia |
| 225 | Flow rate | 0.001 | klb/hr |
| 240 | Flow rate | 0 | klb/hr |
| 250 | Temperature | 80 | ° F. |
|  | Pressure Drop | 4 | psi |
| 260 | Duty | 0 | M Btu/hr |
|  | Pressure Drop | 1 | psi |
| 280 | Pressure | 580 | psia |

Only one change in operating conditions, i.e. one operational change, is needed to affect the composition of the stream to be removed, i.e. stream 230. Therefore, for simplicity and ease of illustration, the operational change will be the pressure in the first flash drum 210. The base case pressure in the first flash drum 210 is 215 psia as shown in Table 1.

Pursuant to step 140, the component mass flow rates of stream 225 are tagged as KOVs to monitor their changes as a function of the pressure in the first flash drum 210. Table 2 summarizes the effect on the component mass flow rates of stream 225 from changing the pressure of drum 210 from 215 psia to 200 psia, as well as the effect the pressure change had on the compressor 280 and products 2 and 3. The derivatives are created for all key outputs based on the operation change in pressure in drum 210, as shown in Table 2, and based on the components (methane, ethane, propane, butane, and pentane) of stream 240, as shown in Table 3. The partial derivatives can be calculated as follows:

$$\text{Derivative} = \frac{\text{Value After Perturbation} - \text{Base Case Value}}{\text{Step Size}}$$

TABLE 2

Effect of pressure change in drum 210

|  | Units | Base Case | Drum 210 Pressure Change | Derivatives |
|---|---|---|---|---|
| Inputs |  |  |  |  |
| Feed 240 Methane Comp | Percent | 0 | 0 |  |
| Feed 240 Ethane Comp | Percent | 100 | 100 |  |
| Feed 240 Propane Comp | Percent | 0 | 0 |  |
| Feed 240 Butane Comp | Percent | 0 | 0 |  |
| Feed 240 Pentane Comp | Percent | 0 | 0 |  |
| Stream 240 Mass Rate | klb/hr | 0 | 0 |  |
| Drum 210 Pressure | Psia | 215 | 200 |  |
| Results |  |  |  |  |
| Compressor 280 Work | MM BTU/hr | 1.4116 | 1.4152 | −0.00024 |
| Product 2 Methane Rate | klb/hr | 19.3632 | 19.3812 | −0.00120 |
| Product 2 Ethane Rate | klb/hr | 17.2585 | 17.3293 | −0.00472 |
| Product 2 Propane Rate | klb/hr | 13.3178 | 13.4328 | −0.00766 |
| Product 2 Butane Rate | klb/hr | 7.0965 | 7.1578 | −0.00409 |
| Product 2 Pentane Rate | klb/hr | 2.4193 | 2.3959 | −0.00157 |
| Product 3 Methane Rate | klb/hr | 0.2133 | 0.2643 | −0.00340 |
| Product 3 Ethane Rate | klb/hr | 0.8370 | 1.0394 | −0.01349 |
| Product 3 Propane Rate | klb/hr | 1.8608 | 2.3217 | −0.03073 |
| Product 3 Butane Rate | klb/hr | 2.9092 | 3.6285 | −0.04795 |
| Product 3 Pentane Rate | klb/hr | 2.6189 | 3.2005 | −0.03877 |
| Stream 225 Methane Rate | klb/hr | 19.5769 | 19.6458 | −0.00460 |
| Stream 225 Ethane Rate | klb/hr | 18.0958 | 18.3690 | −0.01821 |
| Stream 225 Propane Rate | klb/hr | 15.1789 | 15.7547 | −0.03839 |
| Stream 225 Butane Rate | klb/hr | 10.0059 | 10.7865 | −0.05204 |
| Stream 225 Pentane Rate | klb/hr | 5.0383 | 5.5965 | −0.03721 |
| Stream 225 Mass Rate | klb/hr | 67.8958 | 70.1525 | −0.15045 |

Table 3 below shows the effect of perturbing 1 klb/hr of each component, one at a time, in feed stream 240 to monitor its effect on downstream units.

TABLE 3

Effects of perturbing each component of feed stream 240

|  |  |  |  |  |  |  |  | Derivatives (Units/(klb/hr)) | | | | |
|---|---|---|---|---|---|---|---|---|---|---|---|---|
|  | Units | Base Case | Methane | Ethane | Propane | Butane | Pentane | Methane | Ethane | Propane | Butane | Pentane |
| Inputs |  |  |  |  |  |  |  |  |  |  |  |  |
| Feed 240 Methane Comp | % | 0 | 100 | 0 | 0 | 0 | 0 |  |  |  |  |  |
| Feed 240 Ethane Comp | % | 100 | 0 | 100 | 0 | 0 | 0 |  |  |  |  |  |
| Feed 240 Propane Comp | % | 0 | 0 | 0 | 100 | 0 | 0 |  |  |  |  |  |
| Feed 240 Butane Comp | % | 0 | 0 | 0 | 0 | 100 | 0 |  |  |  |  |  |
| Feed 240 Pentane Comp | % | 0 | 0 | 0 | 0 | 0 | 100 |  |  |  |  |  |
| Feed 240 Mass Rate | klb/hr | 0 | 1 | 1 | 1 | 1 | 1 |  |  |  |  |  |
| Drum 210 Pressure | Psia | 215 | 215 | 215 | 215 | 215 | 215 |  |  |  |  |  |
| Results |  |  |  |  |  |  |  |  |  |  |  |  |
| Compressor 280 Work | MM BTU/hr | 1.4116 | 1.4644 | 1.4320 | 1.4182 | 1.4075 | 1.4009 | 0.0528 | 0.0204 | 0.0066 | −0.0041 | −0.0107 |
| Product 2 Methane Rate | klb/hr | 19.3632 | 20.3797 | 19.3698 | 19.3542 | 19.3335 | 19.3183 | 1.0165 | 0.0066 | −0.0090 | −0.0298 | −0.0449 |
| Product 2 Ethane Rate | klb/hr | 17.2585 | 17.3552 | 18.2400 | 17.2263 | 17.1482 | 17.0860 | 0.0967 | 0.9815 | −0.0322 | −0.1103 | −0.1725 |
| Product 2 Propane Rate | klb/hr | 13.3178 | 13.5162 | 13.3734 | 14.1269 | 13.0895 | 12.9748 | 0.1984 | 0.0556 | 0.8090 | −0.2283 | −0.3430 |
| Product 2 Butane Rate | klb/hr | 7.0965 | 7.3484 | 7.1698 | 7.0190 | 7.4962 | 6.6745 | 0.2519 | 0.0733 | −0.0774 | 0.3997 | −0.4220 |
| Product 2 Pentane Rate | klb/hr | 2.4193 | 2.5713 | 2.4641 | 2.3786 | 2.2637 | 2.5871 | 0.1519 | 0.0447 | −0.0407 | −0.1556 | 0.1677 |
| Product 3 Methane Rate | klb/hr | 0.2133 | 0.1969 | 0.2067 | 0.2224 | 0.2431 | 0.2583 | −0.0165 | −0.0066 | 0.0090 | 0.0298 | 0.0449 |
| Product 3 Ethane Rate | klb/hr | 0.8370 | 0.7403 | 0.8555 | 0.8692 | 0.9473 | 1.0095 | −0.0967 | 0.0185 | 0.0322 | 0.1103 | 0.1725 |

TABLE 3-continued

Effects of perturbing each component of feed stream 240

| | Units | Base Case | Methane | Ethane | Propane | Butane | Pentane | Derivatives (Units/(klb/hr)) | | | | |
|---|---|---|---|---|---|---|---|---|---|---|---|---|
| | | | | | | | | Methane | Ethane | Propane | Butane | Pentane |
| Product 3 Propane Rate | klb/hr | 1.8608 | 1.6624 | 1.8052 | 2.0518 | 2.0892 | 2.2038 | −0.1984 | −0.0556 | 0.1910 | 0.2283 | 0.3430 |
| Product 3 Butane Rate | klb/hr | 2.9092 | 2.6573 | 2.8359 | 2.9867 | 3.5095 | 3.3313 | −0.2519 | −0.0733 | 0.0774 | 0.6003 | 0.4220 |
| Product 3 Pentane Rate | klb/hr | 2.6189 | 2.4670 | 2.5742 | 2.6596 | 2.7746 | 3.4512 | −0.1519 | −0.0447 | 0.0407 | 0.1556 | 0.8323 |

Pursuant to step 145A or 145B, each derivative is negated to mimic the removal of the components in the stream 230 instead of the addition of the components in the stream 240. Such results are shown in Table 4 below.

TABLE 4

Negated derivatives of Table 3

| Negated Derivatives | Units | Base Case | Methane | Ethane | Propane | Butane | Pentane |
|---|---|---|---|---|---|---|---|
| Compressor 280 Work | MM BTU/hr/(klb/hr) | — | −0.0528 | −0.0204 | −0.0066 | 0.0041 | 0.0107 |
| Product 2 Methane Rate | (klb/hr)/(klb/hr) | — | −1.0165 | −0.0066 | 0.0090 | 0.0298 | 0.0449 |
| Product 2 Ethane Rate | (klb/hr)/(klb/hr) | — | −0.0967 | −0.9815 | 0.0322 | 0.1103 | 0.1725 |
| Product 2 Propane Rate | (klb/hr)/(klb/hr) | — | −0.1984 | −0.0556 | −0.8090 | 0.2283 | 0.3430 |
| Product 2 Butane Rate | (klb/hr)/(klb/hr) | — | −0.2519 | −0.0733 | 0.0774 | −0.3997 | 0.4220 |
| Product 2 Pentane Rate | (klb/hr)/(klb/hr) | — | −0.1519 | −0.0447 | 0.0407 | 0.1556 | −0.1677 |
| Product 3 Methane Rate | (klb/hr)/(klb/hr) | — | 0.0165 | 0.0066 | −0.0090 | −0.0298 | −0.0449 |
| Product 3 Ethane Rate | (klb/hr)/(klb/hr) | — | 0.0967 | −0.0185 | −0.0322 | −0.1103 | −0.1725 |
| Product 3 Propane Rate | (klb/hr)/(klb/hr) | — | 0.1984 | 0.0556 | −0.1910 | −0.2283 | −0.3430 |
| Product 3 Butane Rate | (klb/hr)/(klb/hr) | — | 0.2519 | 0.0733 | −0.0774 | −0.6003 | −0.4220 |
| Product 3 Pentane Rate | (klb/hr)/(klb/hr) | — | 0.1519 | 0.0447 | −0.0407 | −0.1556 | −0.8323 |

In accordance with step 170, the amount of partial withdrawal is set to 10 klb/hr, i.e. the flow rate of stream 230 is now set at 10 klb/hr, to determine the effect of withdrawing this stream on the facility. To further illustrate the effects on downstream compositions, the pressure in drum 210 is re-set to 210 psia. The rate of stream 225 can then be determined using the derivatives for pressure (shown in Table 2) and the following equation:

225Mass Rate=BaseCaseRate+Derivative*(New-DrumP−Base CaseDrumP)225Mass-Rate=67.8958−0.15045*(210−215)=68.6480 klb/hr As explained in step 180, the component rates of steam 230 can then be determined using the negated derivatives (shown in Table 4) and the following equation:

$$230 \text{ Methane Rate} = \{BaseCase225MethCompRate + Derivative * (\text{New Drum } P - \text{Base Case Drum } P)\} * \frac{230 \text{ Mass Rate}}{225 \text{ Mass Rate}}$$

-continued $$230 \text{ Methane Rate} = \{19.5769 - 0.00460 * (210 - 215)\} * \frac{10}{68.6480} = 2.8551 \text{ klb/hr}$$

The work for the compressor 280 can be determined as follows, and Table 5 summarizes the component rates of streams 225 and 230, and the work for compressor 280.

280Work=BaseCase280Work+*MethDeriv**(230*Meth*−BaseCase230*Meth*)+*EthDeriv**(230*Eth*−BaseCase230*Eth*)+*PropDeriv**(230*Prop*−BaseCase230*Prop*)+*ButDeriv**(230*But*−BaseCase230*But*)+*PentDeriv**(230*Pent*−BaseCase230*Pent*)+210*Pres**(210*Pres*−BaseCase210*Pres*)

*where Base Case 230 Meth=Base Case 230 Mass Rate*Base Case 225 Meth

280Work=1.4116−0.05280*(2.8551−0)−0.02036*(2.6493−0)−0.00659*(2.2391−0)+0.0041*(1.4955−0)+0.01069*(0.7610−0)−0.00024*(210±215)=1.2076 MMBtu/hr

TABLE 5

Effects on component rates of streams 225 and 230, and the work for compressor 280

| LP Calculated Values | Units | Value |
|---|---|---|
| Compressor 280 Work | MM BTU/hr | 1.2076 |
| Product 2 Methane Rate | klb/hr | 16.5485 |
| Product 2 Ethane Rate | klb/hr | 14.7744 |
| Product 2 Propane Rate | klb/hr | 11.4335 |
| Product 2 Butane Rate | klb/hr | 6.1002 |
| Product 2 Pentane Rate | klb/hr | 2.0556 |
| Product 3 Methane Rate | klb/hr | 0.1959 |
| Product 3 Ethane Rate | klb/hr | 0.7629 |
| Product 3 Propane Rate | klb/hr | 1.6981 |
| Product 3 Butane Rate | klb/hr | 2.6703 |
| Product 3 Pentane Rate | klb/hr | 2.4077 |
| Stream 230 Methane Rate | klb/hr | 2.8551 |
| Stream 230 Ethane Rate | klb/hr | 2.6493 |
| Stream 230 Propane Rate | klb/hr | 2.2391 |
| Stream 230 Butane Rate | klb/hr | 1.4955 |
| Stream 230 Pentane Rate | klb/hr | 0.7610 |
| Stream 225 Mass Rate | klb/hr | 68.6480 |

A comparison to results from the Non-Linear Program is shown in Table 6 below.

TABLE 6

The LP Results Compared to Non Linear Program Results

| Process or Stream | Units | LP Values | NLP Values | Error (LP − NLP) | Relative % Error |
|---|---|---|---|---|---|
| Compressor 280 Work | MM BTU/hr | 1.2076 | 1.2072 | 0.00050 | 0.041 |
| Product 2 Methane Rate | klb/hr | 16.5485 | 16.5483 | 0.00023 | 0.001 |
| Product 2 Ethane Rate | klb/hr | 14.7744 | 14.7679 | 0.00649 | 0.044 |
| Product 2 Propane Rate | klb/hr | 11.4335 | 11.4155 | 0.01797 | 0.157 |
| Product 2 Butane Rate | klb/hr | 6.1002 | 6.0823 | 0.01784 | 0.293 |
| Product 2 Pentane Rate | klb/hr | 2.0556 | 2.0594 | −0.00385 | 0.187 |
| Product 3 Methane Rate | klb/hr | 0.1959 | 0.1960 | −0.00008 | 0.043 |
| Product 3 Ethane Rate | klb/hr | 0.7629 | 0.7697 | −0.00673 | 0.874 |
| Product 3 Propane Rate | klb/hr | 1.6981 | 1.7142 | −0.01616 | 0.943 |
| Product 3 Butane Rate | klb/hr | 2.6703 | 2.6794 | −0.00916 | 0.342 |
| Product 3 Pentane Rate | klb/hr | 2.4077 | 2.3937 | 0.01401 | 0.585 |

Figure 3:
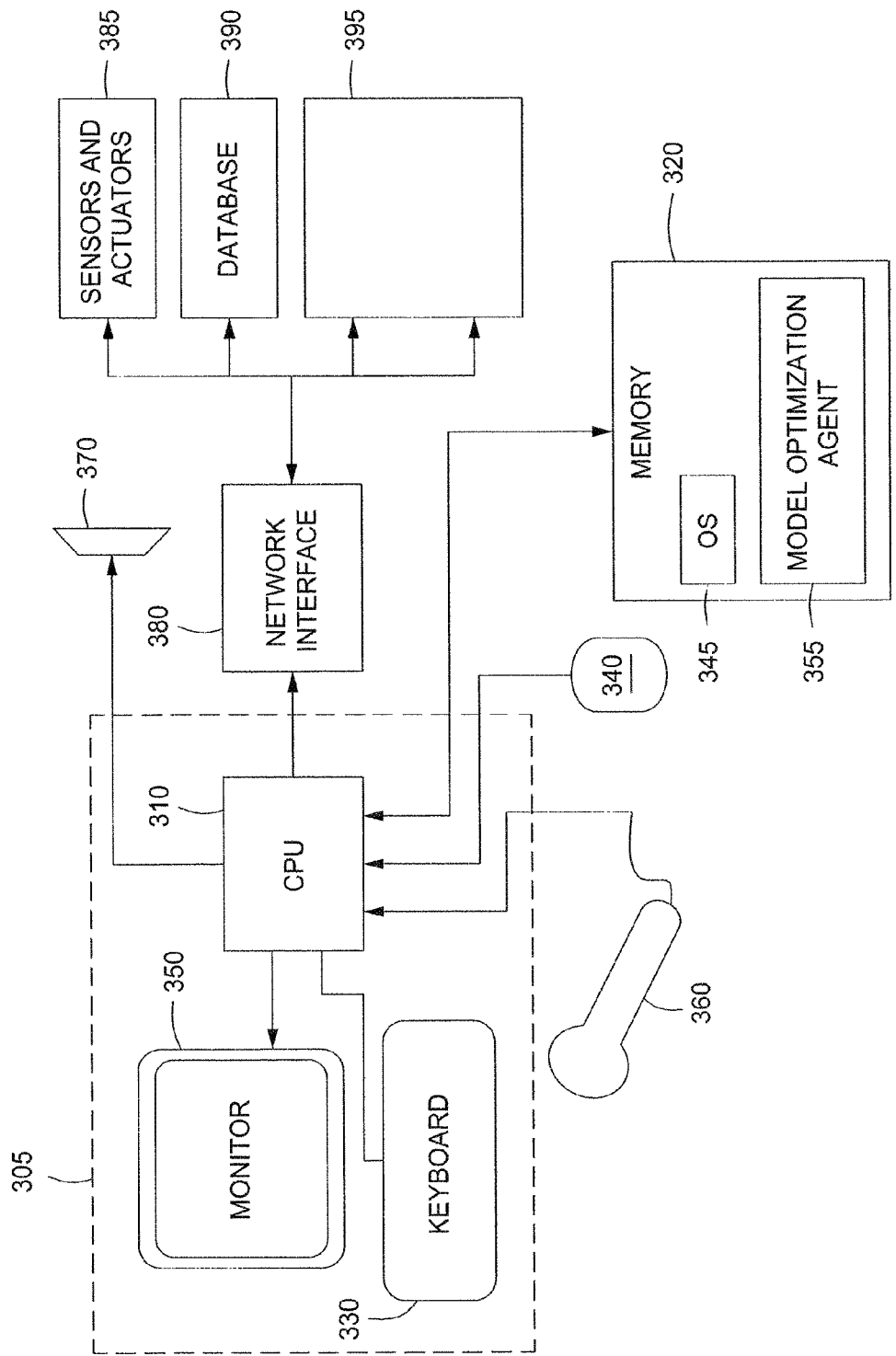
FIG. 3 depicts a representative computer system adapted to utilize a linear programming (LP) model for operating and/or optimizing a facility, according to one or more embodiments described.

FIG. 3 depicts a representative computer system adapted to utilize a LP model for operating and/or optimizing a facility, according to one or more embodiments. As shown, the computer 305 can include a central processing unit 310, an input device or keyboard 330, and a monitor 350. The computer 305 can also include a memory 320 as well as additional input and output devices, for example a mouse 340, a microphone 360 and a speaker 370. The mouse 340, the microphone 360 and the speaker 370 can be used for, among other purposes, universal access and voice recognition or commanding. The monitor 350 can be touch-sensitive to operate as an input device as well as a display device.

The computer system 305 can interface with database 390, one or more other databases or storage devices 395, sensors and actuators 385, and/or the internet via the network interface 380. As used herein, the term "sensor" refers to a device used to measure a variable within the process and communicate the measurement to the control system. As used herein, the term "actuator" is a device capable of affecting the process in response to a signal from the control system. Illustrative actuators can include, but are not limited to, valves, rheostats, motors, and switches. It should be understood that the term "network interface" does not indicate a limitation to interfaces that use only Ethernet connections and refers to all possible external interfaces, wired or wireless. It should also be understood that database 390, the one or more other databases or storage devices 395, and/or the sensors and actuators 385 are not limited to interfacing with computer 305 using network interface 380 and can interface with computer 305 in any means sufficient to create a communications path between the computer 305 and database 390, one or more other databases or storage devices 395, and/or sensor and actuators 385. For example, in one or more embodiments, database 390 can interface with computer 305 via a USB interface while sensors and actuators 385 can interface via a FOUNDATION FIELDBUS interface without using the network interface 380.

It should be understood that even though the computer system 305 is shown as a platform on which the methods described can be performed, the methods described can be performed on any platform where users can interact with manufacturing facility processes, sensors, actuators, and/or machinery. For example, the many and varied embodiments described herein can be used on any device that has computing capability where users can interface and interact with any systems within a given manufacturing environment. For example, the computing capability can include the capability to access PROFIBUS, FOUNDATION FIELDBUS, or other communications bus protocols via the network interface 380 such that the user can interact with the many and varied processes or sensors and actuators within a given manufacturing environment. These devices can include, but are not limited to and are presented for illustrative purposes only: supercomputers, arrayed computer networks, distributed computer networks, desktop personal computers (PCs), tablet PCs, hand held PCs, laptops, devices sold under the trademark names BLACKBERRY™ or PALM™, cellular phones, hand held music players, or any other device or system upon which a user can interact with at least some of the systems resident in any given manufacturing environment.

Referring again to FIG. 3, one or more computer programs can be stored in the memory 320 and the central processing unit 310 can work in concert with at least the memory 320, the input device 330 and the output device 350 to perform tasks for the user. In one or more embodiments, the memory 320 includes any number and combination of memory devices, without limitation, as is currently available or can become available in the art. In one or more embodiments, memory devices can include without limitation, and for illustrative purposes only: database 390, hard drives, disk drives, random access memory, read only memory, electronically erasable programmable read only memory, flash memory, thumb drive, one or more other databases or storage devices 395, and any other memory device. Those skilled in the art are familiar with the many variations that can be employed using memory devices and no limitations should be imposed on the embodiments herein due to memory device configurations and algorithm prosecution techniques.

The memory 320 can store an operating system (OS) 345, and a model optimization agent 355. The operating system 345 can facilitate control and execution of the optimization agent 355 using the CPU 310. Any of the available operating systems can be used in this manner including WINDOWS, LINUX, Apple OS, UNIX and the like.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for withdrawing a fluid stream from a petroleum, petrochemical, or chemical manufacturing facility using a linear programming model of the facility, the method comprising:
   (a) providing a reference model of the manufacturing facility, the reference model operating on a first vector of rank n of inputs $\{I\}$ to produce a second vector of rank m of outputs $\{K\}$, wherein
      (i) $n \geq 1$ and $m \geq 1$,
      (ii) at least one of the inputs simulates an input fluid stream,
         (A) the input fluid stream having a total mass flow rate $\{FI\}$ to the reference model,
         (B) the input fluid stream including at least one molecular component,
         (C) each of the molecular components having a mass flow rate to the reference model, the sum of the component mass flow rates being substantially equal to the total mass flow rate $\{FI\}$; and
      (iii) the reference model includes at least one simulated intermediate fluid stream, one of the intermediate streams being a designated intermediate stream,
         (A) the designated intermediate stream having a total mass flow rate $\{F\}$ within the reference model,
         (B) the designated intermediate stream including a third vector of rank j of molecular components $\{C\}$, $j \geq 1$, and
         (C) each of the j molecular components of the designated intermediate stream having a corresponding mass flow rate $\{CF_j\}$ within the reference model, the sum of each of the component mass flow rates $\{CF_j\}$ being substantially equal to the total mass flow rate $\{F\}$; and
      (iv) at least one of the outputs simulates an output fluid from the reference model,
         (A) the output fluid having a total mass flow rate $\{FO\}$ from the reference model,
         (B) the output fluid including at least one molecular component,
         (C) the molecular component having a total mass flow rate from the reference model, the sum of the component mass flow rates being substantially equal to the total mass flow rate $\{FO\}$;
   (b) specifying an initial value $\{I_n^i\}$ for each of the n elements of $\{I\}$ and operating the reference model on the $\{I_n^i\}$ to produce (i) initial outputs $\{K_m^i\}$ for each of the m elements of $\{K\}$, (ii) an initial $\{F^i\}$ for the intermediate stream, (iii) initial $\{C_j^i\}$ for each of the j components of $\{C\}$, and (iv) initial $\{CF_j^i\}$ for each of the j components of $\{CF\}$;
   (c) providing j simulated streams $\{S\}$, each of the $\{S_j\}$ being of substantially the same composition as its corresponding $\{C_j\}$ over the range of j, each of the $\{S_j\}$ having a mass flow rate, each of the mass flow rates being substantially equal;
   (d) adding to and then removing from the designated intermediate stream each of the j simulated streams $\{S_j\}$ in sequence and recording any change in a designated element $\{K_m\}$ of vector $\{K\}$ from the reference model during the adding of each of the j streams $\{S_j\}$, the adding, removing, and recording being conducted while holding the reference model and the vector $\{I^i\}$ substantially constant, in order to produce a vector of rank j of partial derivatives $\{dK_m/dS_j\}$, the jth partial derivative being determined by dividing the recorded change in the designated element $\{K_m\}$ by the mass flow rate of stream $\{S_j\}$;
   (e) simulating a diversion of a weight fraction $\{W\}$ of the entire designated intermediate stream away from the reference model;
   (f) deriving the linear programming model from the reference model, the linear programming model being expressed as $K_m^f - K_m^i = W * \Sigma_j - 1 * CF_j^i * dK_m/dS_j$, and then using a computer to solve the linear programming model to determine a final value $\{K_m^f\}$ for the designated element $\{K_m\}$ resulting from the diversion of step (e); and then
   (g) withdrawing a weight fraction $\{W\}$ of the intermediate fluid stream from the manufacturing facility in order to change the mass flow rate of the output fluid from the facility to a final value, the final value being substantially equal to the corresponding $K_m$ obtained in step (f).

2. The method of claim 1, wherein the reference model includes one or more of (i) at least one separation stage, (ii) at least one compression stage, and (iii) at least one heat exchange stage.

3. The method of claim 1, wherein the input fluid stream comprises hydrocarbon.

4. The method of claim 1, wherein the intermediate stream comprises one or more of methane, ethane, propane, butane, or pentane.

5. The method of claim 1, wherein the designated element $\{K_m\}$ is compressor work.

6. The method of claim 1, wherein the mass flow rate of each of the $S_j$ is substantially equal to 0.1 times the amount of the designated intermediate stream that is diverted in step (e).

7. The method of claim 1, wherein n and m are each greater than or equal to 10.

8. The method of claim 1, wherein j is greater than or equal to 5.

* * * * *